(12) United States Patent
Vigars et al.

(10) Patent No.: US 10,323,619 B2
(45) Date of Patent: Jun. 18, 2019

(54) WATER CURRENT POWER GENERATION SYSTEMS

(71) Applicant: TIDAL GENERATION LIMITED, Stafford, Staffordshire (GB)

(72) Inventors: Paul Vigars, Bristol (GB); Christopher Huxley-Reynard, Bristol (GB)

( * ) Notice: Subject to any disclaimer, the term of this patent is extended or adjusted under 35 U.S.C. 154(b) by 525 days.

(21) Appl. No.: 14/899,712

(22) PCT Filed: May 9, 2014

(86) PCT No.: PCT/GB2014/051420
§ 371 (c)(1),
(2) Date: Dec. 18, 2015

(87) PCT Pub. No.: WO2014/202946
PCT Pub. Date: Dec. 24, 2014

(65) Prior Publication Data
US 2016/0138555 A1     May 19, 2016

(30) Foreign Application Priority Data

Jun. 18, 2013  (GB) .................................. 1310816.2

(51) Int. Cl.
  *F03B 3/12*   (2006.01)
  *F03B 13/26*  (2006.01)
  *F03B 17/06*  (2006.01)

(52) U.S. Cl.
  CPC ............ *F03B 3/128* (2013.01); *F03B 13/264* (2013.01); *F03B 17/061* (2013.01);
  (Continued)

(58) Field of Classification Search
  CPC ........ F03B 3/128; F03B 13/12; F03B 13/264; F03B 17/06; F03B 17/061; F05B 2250/40;
  (Continued)

(56) References Cited

U.S. PATENT DOCUMENTS 7,859,128 B2 *  12/2010  Gibberd ............... F03B 13/264
                                                      290/43
2004/0070210 A1  4/2004  Johansen et al.
(Continued)

FOREIGN PATENT DOCUMENTS

GB    2431628 A    5/2007
GB    2437533 A    10/2007
(Continued)

OTHER PUBLICATIONS

Jan. 21, 2014 Search Report issued in British Patent Application No. 1310816.2.
(Continued)

*Primary Examiner* — Ninh H. Nguyen
*Assistant Examiner* — Brian P Wolcott
(74) *Attorney, Agent, or Firm* — Dority & Manning, P.A.

(57) ABSTRACT

An underwater structure including a power generation apparatus including a main body; a mounting portion connected to the main body defining a mounting axis; a connection carrier, a connector mounted on the connection carrier; and an actuation mechanism in communication with the connection carrier. The structure further includes a support structure adapted for engagement with a bed of a body of water; a support housing; a support connection carrier attached to the support housing; and a support connector mounted on the support connection carrier. The mounting portion and the support housing are adapted to cooperate with one another for mounting of the power generation apparatus on the support structure. The connection carrier is releasably engageable with the support connection carrier, such that the connection carrier is moveable between an engaged position and a disengaged position.

15 Claims, 2 Drawing Sheets

(52) U.S. Cl.
CPC ..... *F05B 2230/604* (2013.01); *F05B 2240/97* (2013.01); *F05B 2250/40* (2013.01); *F05B 2260/507* (2013.01); *Y02E 10/28* (2013.01); *Y02P 70/527* (2015.11)

(58) Field of Classification Search
CPC ............ F05B 2240/97; F05B 2260/507; F05B 2230/604; F05B 2220/32; Y02P 70/527; Y02E 10/28
USPC .............................................. 415/3.1, 8, 906
See application file for complete search history.

(56) References Cited

U.S. PATENT DOCUMENTS

| | | | | |
|---|---|---|---|---|
| 2009/0302611 | A1* | 12/2009 | Masters | F03B 11/06 290/53 |
| 2010/0038911 | A1 | 2/2010 | Vigars | |
| 2010/0129221 | A1* | 5/2010 | Huxley-Reynard | E02B 9/08 416/169 R |
| 2011/0316282 | A1* | 12/2011 | Holstein | F03B 13/10 290/54 |
| 2012/0200084 | A1* | 8/2012 | Blaxland | F03B 13/10 290/43 |
| 2012/0202369 | A1* | 8/2012 | Blaxland | F03B 13/10 439/271 |

FOREIGN PATENT DOCUMENTS

| | | |
|---|---|---|
| GB | 2448710 A | 10/2008 |
| WO | 2007/125349 A2 | 11/2007 |

OTHER PUBLICATIONS

Oct. 13, 2014 International Search Report issued in International Patent Application No. PCT/GB2014/051420.

Oct. 13, 2014 Written Opinion issued in International Patent Application No. PCT/GB2014/051420.

\* cited by examiner

WATER CURRENT POWER GENERATION SYSTEMS

The present invention relates to water current power generation systems, and in particular to such systems which employ removable power generation apparatus.

BACKGROUND OF THE INVENTION

It is widely known that easily accessible resources of fossil fuels are declining. In addition, the impact of the use of fossil fuels upon the environment has become increasingly apparent. As a result of this, it has become imperative that viable alternative energy sources are used as effectively and efficiently as possible. The use of turbines to capture the power of water flow, such as tidal, river and ocean current flows is becoming a viable source of alternative energy. The turbine equipment used to capture such water flow energy typically includes a shaft driven generator connected using a drivetrain to a rotor assembly. The rotor assembly includes a plurality of rotor blades that are driven by the water flow, so as to turn an input shaft of the drivetrain.

In order to be economically practical, multiple water current turbine devices need to be deployed in a suitable area. For example, a tidal turbine farm may have tens to hundreds of turbines. The turbines are preferably arranged in an array having multiple rows of multiple turbines. The turbine array could be deployed in a tidal flow area, a river flow, an ocean current, or any other suitable water current area. Although it is preferable for the turbines to be arranged in an array, geography, bathymetry and other factors may mean that a turbine farm has another arrangement.

Such turbine equipment needs to be secured to the bed of a body of water, such as a sea, estuary or river. Conventional underwater turbines used to drive electrical generators are mounted on a horizontal rotational axis and require a significant amount of ancillary features, in order to maximise energy capture. One such feature that is essential for efficient energy generation is yaw capability: it must be possible to direct the turbine to the most effective orientation with respect to the direction of current flow at any particular time.

Installation, maintenance and servicing of underwater power generation apparatus, particularly in deep sea environments, are highly costly and time consuming procedures. It is therefore desirable to simplify the construction and deployment of underwater power generation apparatus, lowering capital cost and reducing the frequency with which in service intervention is required.

SUMMARY OF THE INVENTION

According to one aspect of the present invention, there is provided an underwater structure comprising:
 a power generation apparatus including a main body, a mounting portion rigidly connected to and extending from the main body defining a mounting axis, a connection carrier, a connector mounted on the connection carrier, and an actuation mechanism in communication with the connection carrier; and
 a support structure adapted for engagement with a bed of a body of water, and including a support housing, a support connection carrier received within the support housing, and a support connector mounted on the support connection carrier;
wherein the mounting portion and the support housing are adapted to cooperate with one another for mounting of the power generation apparatus on the support structure; and
in which the connection carrier is releasably engageable with the support connection carrier, such that the connection carrier is moveable between
 an engaged position in which the actuation mechanism is operable to rotate the mounting portion about the mounting axis; and
 a disengaged position in which the actuation mechanism is operable to rotate the connection carrier about the mounting axis.

The mounting portion is rigidly connected to the main body of the power generation apparatus, such as for example a turbine. Therefore, in the engaged position, rotation of the mounting portion about the mounting axis causes rotation of the main body of the power generation apparatus about the mounting axis.

The mounting portion and the support housing may be adapted to cooperate with one another for mounting of the power generation apparatus on the support structure in any polar orientation about the mounting axis. The mounting portion and the support housing may however comprise a discrete number of positions or a limited range of continuous positions for mounting of the power generation apparatus on the support structure.

In one example of such a structure, the mounting portion defines a substantially continuous mounting surface which extends substantially completely around the mounting portion. The support housing may define a substantially continuous support surface which extends substantially completely around the support housing. The mounting surface and support surface are preferably arranged to abut one another substantially continuously when the power generation apparatus is mounted on the support structure, The structure may further comprise a coupling for securing the power generation apparatus to the support structure. The coupling may be moveable between a clamping position in which the power generation apparatus is fixedly engaged with respect to the support structure, and a bearing position in which the coupling allows rotation of the power generating apparatus about the mounting axis with respect to the support structure. The power generating apparatus may therefore only rotate about the mounting axis if the coupling is in the bearing position.

In the engaged position, the torque from the actuation mechanism is transmitted through the connection carrier into the support connection carrier and into the support housing. The support housing is part of the support structure which is affixed to the sea bed and as such resists the torque of the actuation mechanism and causes rotation of the mounting portion. The electrical and other wetmate connectors located within the mounting portion and/or support structure are arranged so as to not be significantly loaded by the torque. In one example of such as structure, the connection carrier engages at least one alignment feature provided by the support connection carrier. For example, the connection carrier may comprise at least one alignment pin arranged in use to engage at least one alignment aperture provided by the support connection carrier, in which the at least one aperture is shaped and dimensioned to receive the alignment feature(s). The connection carrier may for example provide two spaced apart alignment pins. The support connection carrier may provide at least one alignment aperture, for example two alignment apertures, arranged to receive the alignment pin(s) of the connection carrier. It is to be noted that the alignment pin(s) may be provided on the support connection carrier, and the corresponding alignment aperture(s) on the connection carrier of the mounting portion. It will be readily appreciated that each of the carriers may be provided with both alignment pins and alignment aperture (s), with corresponding apertures and pins being provided on the other of the carriers.

A yaw bearing component may be provided by the connection carrier and the support connection carrier. For example, the connection plate of the connection carrier may provide a yaw bearing component extending around the periphery thereof.

The connection carrier may be moveable in a direction extending substantially parallel to the mounting axis and/or rotatable about the mounting axis. The actuation mechanism may be capable of rotating the connection carrier about the mounting axis as well as moving the connection carrier in a direction extending substantially parallel to the mounting axis. The structure may however further comprise at least one further actuation mechanism operable to move the connection carrier between said engaged and disengaged position and/or to rotate the connection carrier about the mounting axis. In a particular example, one actuator is provided for rotation and a second actuator is provided for axial movement.

The support connection carrier may be attached to the support housing. The support structure may include a support connection actuation mechanism operable to move the support connection carrier in a direction extending substantially parallel to the mounting axis, and/or to rotate the support connection carrier about the mounting axis. The support connection actuation mechanism may be provided by a single actuation mechanism.

The support connection carrier may for example be frictionally retained within the support housing. The support connection carrier may however be permanently retained within the support housing, for example the carrier may be welded to the housing. The alignment pins of the connection carrier could be arranged to engage a welded feature of the support connection carrier. The support connection carrier may provide at least one retaining means operable to provide releasable engagement of the support connection carrier with the support housing. The support housing may provide at least one retaining means for releasable engagement with the at least one retaining means of the support connection carrier. The at least one retaining means may comprise at least one locking actuator.

The support connection carrier is preferably removable from the support housing.

In one example of such a structure, the support connection carrier is provided by a substantially planar plate.

DETAILED DESCRIPTION OF THE PREFERRED EMBODIMENTS

Figure 1A:
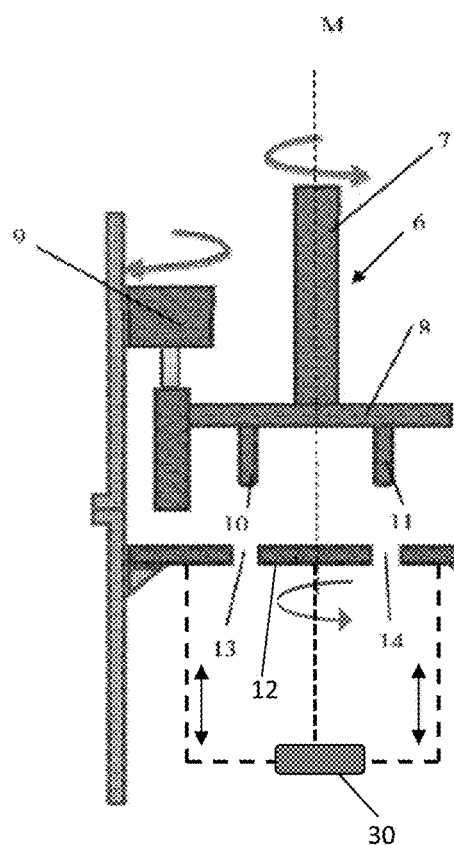
FIGS. 1A and 1B are schematic cross-sectional views of the mounting portion and the support housing of a water current power generation system according to one embodiment of the present invention in a disengaged position (FIG. 1A) and an engaged position (FIG. 1B)
Figure 1B:
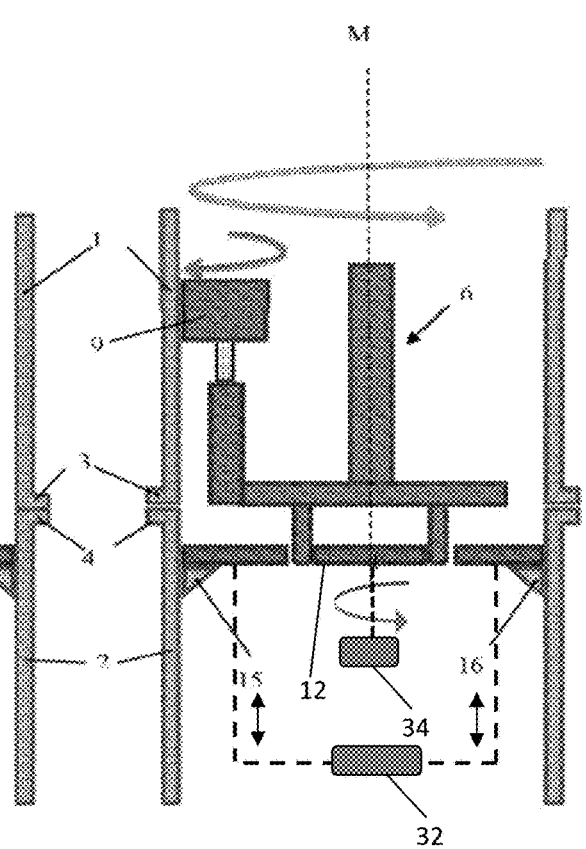

A mounting portion 1 of a water current power generation system (not shown) and a support structure 2 is shown in FIGS. 1A and 1B. The support structure 2 is to be located on a bed of a body of water. A power generation apparatus (not shown), such as a turbine device, is mounted on the support structure 2. In this example, as the water current flows past the power generation apparatus, a rotor assembly turns, thereby driving an electrical generator, or other power converter apparatus, provided in the power generation apparatus.

The power generation apparatus comprises a main body, on which is rotatably mounted a rotor assembly. The rotor assembly operates to drive an electricity generator, or other power generation apparatus, housed in the main body. The power generation apparatus is adapted for releasable mounting on the support structure 2, and includes a mounting portion 1 to provide this releasable mounting.

The mounting portion 1 comprises a tubular portion defining a mounting axis M for the power generating apparatus. The mounting axis M extends parallel to the longitudinal axis of the tubular portion. The mounting portion 1 has a mounting flange 3 which engages with an associated support flange 4 provided by the support housing 5. The mounting and support flanges 3 and 4 allow the power generating apparatus to be affixed to the support structure 2 in an appropriate manner. For example, the power generating apparatus may be substantially rigidly fixed to the support structure 2 during power generation, and may be rotatable with respect to the support structure 2 during a re-orientation procedure.

The mounting portion 1 may have any suitable shape. For example the mounting portion 1 is a hollow cylinder having a substantially circular cross-section. It will be appreciated that the mounting portion 1 need not be circular in cross section, but may be provided by any suitable shape. For example, the mounting portion 1 may be tapered, such as for example the mounting portion may be in the form of a frustrum. The mounting portion may be a hollow prism.

The mounting portion 1 has, at a distal end thereof, a mounting flange 3, which defines a substantially circular and substantially continuous mounting surface. The mounting portion 1 may further comprise an attachment flange (not shown) for attaching the mounting portion 1 to the main body of the power generation apparatus. The mounting portion 1 can be bolted, welded, or fixed in any other suitable manner, to the main body, and may not require the provision of the attachment flange.

The turbine may further comprise a coupling (not shown) arranged in use to be moveable between a clamping position and a bearing position. In the clamping position, the power generation apparatus is fixedly located with respect to the support structure. As a result, in the clamping position, the coupling prevents rotation of the power generation apparatus about the mounting axis by the actuation mechanism or by any other means, such as hydrodynamic forces. In the bearing position, the power generation unit may be rotated about the mounting axis of the structure.

A connection carrier 6 is provided within the mounting portion 1, and carries any appropriate number of electrical, optical and other connectors (not shown). The electrical, optical and other connectors may be located within housings in order to aid alignment. The precise nature and number of the connectors carried by the connection carrier 6 is not material to examples of the present invention. In FIG. 1A, the connection carrier 6 is shown in a first, disengaged configuration.

The connection carrier 6 may be provided by any suitable shape and configuration. The exemplary connector carrier shown in FIGS. 1A and 1B comprises a carrier shaft (or locating portion) 7 onto which is mounted a carrier plate 8. The carrier plate 8 is substantially circular in shape and may, for example, provide a yaw bearing extending around the periphery of the plate. The connectors are carried by the carrier plate 8, on a mating surface of the carrier plate 8.

The connection carrier shaft 7 is in communication with an actuation mechanism (not shown), such as one or more hydraulic or electrical actuators. The actuation mechanism serves to move the connection carrier 6 in a direction substantially parallel to the mounting axis M. The mounting portion 1 further comprises an actuation mechanism 9 arranged to facilitate rotation of the connection carrier 6 about mounting axis M when in the disengaged position as illustrated in FIG. 1A.

The actuation mechanism 9 may be provided by any suitable arrangement of equipment. In one example, the actuation mechanism 9 may comprise a rotary actuator that operates directly on the carrier shaft 7. The actuation mechanism 9 may, for example, include a rotary actuator that engages drive features of the carrier plate 8 for rotation of the connection carrier 6. The actuation mechanism 9 is located within the cavity provided by the mounting portion 1. However, it is to be understood that the actuation mechanism 9 may be located in any convenient location in the mounting portion 1, and/or in the main body of the power generation apparatus, or even externally to both the main body and the mounting portion.

The connection carrier 6 is provided with at least one alignment pin, such as the two alignment pins 10 and 11, which extend from the carrier plate 8. As will be described in more detail below, the alignment pins 10 and 11 serve to enable accurate alignment of the connection carrier 6 on the support structure 2.

Figure 2:
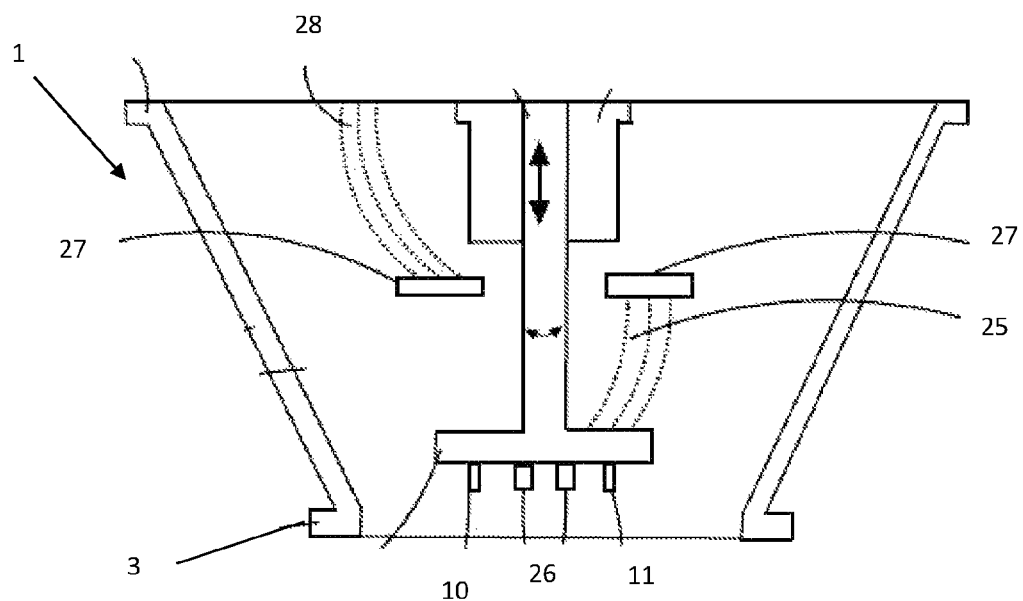
FIG. 2 illustrates an arrangement of connectors within a mounting portion according to one embodiment of the present invention.

As shown in FIG. 2, connector cables 25 are connected with the connectors 26, and are routed through a cable management system 27 before forming at least some connection with cables 28 from the power generating apparatus. It will be appreciated that the cable management system is shown schematically in order that the Figure has the required clarity. It will also be appreciated that the full connections and route of the cables in the cable management system are not shown in FIG. 2, again for the sake of clarity.

The example support housing 5 shown in the Figures is substantially cylindrical, and defines a circular aperture therethrough. It will be readily appreciated that, as for the mounting portion 1 of the power generation apparatus, the support housing 5 can be of any suitable shape and cross section.

A support connection carrier 12 is provided in the support housing 5. The support connection carrier 12 extends across the aperture of the support housing 5, and carries support connectors for connecting to the connector of the connection carrier 6 of the power generating apparatus. Two alignment apertures 13 and 14 are arranged to receive the alignment pins 10 and 11 of the power generating apparatus. The alignment apertures may be located at any suitable location on the support connection carrier 12. For example, the alignment apertures 13 and 14 may be spaced apart and located at the same radii on the carrier 12. Alternatively, the alignment apertures 13 and 14 may be located at different radii on the carrier 12. It will be appreciated that any number of alignment pins 10 and 11 and associated apertures 13 and 14 can be provided. In one example, the alignment apertures 13 and 14 have conical openings configured to allow for some degree of initial misalignment of the alignment pins 10 and 11.

It is to be noted that the alignment pins may be provided on the support connection carrier, and the corresponding alignment apertures on the connection carrier of the mounting portion. It will be readily appreciated that each of the carriers may be provided with both alignment pins and alignment apertures, with corresponding apertures and pins being provided on the other of the carriers.

The support connection carrier 12 may be attached to the support housing 5. The support structure 2 may include a support connection actuation mechanism operable to move the support connection carrier 12 in a direction extending substantially parallel to the mounting axis, and/or to rotate the support connection carrier about the mounting axis. Referring to FIG. 1A, the support connection actuation mechanism may be provided by a single actuation mechanism 30. Referring to FIG. 1B, the support connection actuation mechanism is provided by a first actuation mechanism 32 for movement of the support connection carrier 12 in a direction extending substantially parallel to the mounting axis, and a second actuation mechanism 34 for rotation of the support connection carrier 12 about the mounting axis.

Figure 3:
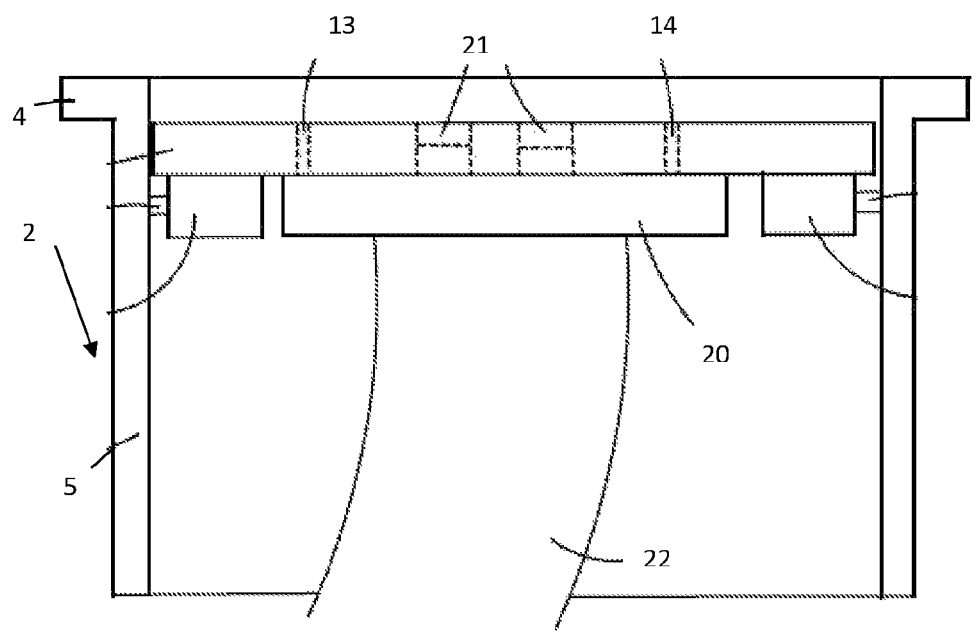
FIG. 3 illustrates an arrangement of connectors within a support housing of a support structure according to one embodiment of the present invention.

As shown in FIG. 3, the support connection carrier 12 also includes a cable connector 20 arranged to connect the support connectors 21 to an input/output cable 22. The cable 22 is used to export generated power from the power generating apparatus. For example, the cable 22 may be used to export electricity generated by the power generating apparatus to a grid connection. In an alternative application, the export cable 22 may be used to transfer hydraulic fluid from the power generating apparatus. The cable 22 can also include control and measurement cables.

The tolerance of the alignment of the connectors 21, 26, such as for example wetmate connectors is very tight. In order to ensure accurate alignment of the connectors 21, 26, the alignment pins 10 and 11 are provided in order to reduce any initial alignment errors during engagement of the connection carrier 6 on the support structure 2. The connection carrier 6 is therefore brought into close enough engagement with the support connection carrier 12 with sufficient initial alignment for the individual connector housings to be able to adjust the final alignment of the connectors.

The support connection carrier 12 is removable from the support housing 5, and is held in place using two retaining features 15 and 16 extending from the inner surface of the housing 5 and arranged to engage the support connection carrier 12. The retaining features 15 and 16 are a lip feature in cross-section. The lip feature comprises a locking mechanism (not shown) which engages under the lip feature. Such an arrangement enables the support connection carrier 12 to be removed from the support housing 5 for maintenance purposes, without the need to remove the whole support structure, or support housing, or to undertake complex underwater cutting and welding operations. It is to be noted that the support connection carrier may be frictionally retained within the support housing 5. In the example illustrated, the load path for the torque goes through the friction interface between the carrier 12 and the lip 15 and 16. In an alternative example, the torque may be transmitted via suitable mechanical engagement features such as pins.

In the disengaged position (as shown in FIG. 1A) the connection carrier 6 is spaced apart from the support connection carrier 12. Activation of the actuation mechanism 9 causes rotation of the carrier plate 8 about the mounting axis M. The actuation mechanism 9 and the perimeter of the connection carrier 6 provide a geared interface. This rotation may be sufficient to enable alignment of the alignment pins 10 and 11 with the apertures 13 and 14 of the support connection carrier 12.

FIG. 1B shows a second configuration in which the connection carrier 6 has been moved axially in a direction substantially parallel to the mounting axis M, such that the connectors and alignment pins 10 and 11 are engaged with associated connectors and alignment apertures 13 and 14 on the support connection carrier 12. The actuation mechanism (not shown) is operated to move the connection carrier 6 into connection with the support connection carrier 12.

Before the connection carrier 6 is moved into position axially, it may need to be rotated in order that the alignment pins 10 and 11 are substantially aligned with the alignment holes 13 and 14 respectively. The first actuator 9 provided within the mounting portion 1 may rotate the connection carrier 6. The rotation may however be achieved by the actuation mechanism which causes the axial movement of the carrier 6.

As the connection carrier 6 moves into connection with the support connection carrier 12, the connectors meet with the corresponding connectors to complete the electrical/hydraulic, optical and/or control connections between the power generating apparatus and the cables.

Activation of the actuation mechanism 9 exerts torque on the connection plate 8. The alignment pins 10 and 11 of the connection carrier 6 are retained with the alignment apertures 13 and 14 of the support connection carrier 12. The support connection carrier 12 is retained in position relative to the support housing 5 by the retaining features. The torque from the actuation mechanism 9 is transmitted from the connection plate 8, through the alignment pins 10 and 11 and into the support connection carrier 12 via the alignment apertures 13 and 14 to the support housing 5 which is part of the support structure which is affixed to the sea bed thereby resisting the torque of the actuation mechanism and causing rotation of the mounting portion 1 of the power generation apparatus (not shown) about the mounting axis M. The connection carrier 6, for example the alignment pins 10 and 11 and the support connection carrier 12 are composed of suitable materials with sufficient strength to transmit the torque from the actuation mechanism 9. The torque required depends on the hydrodynamic, inertial, frictional and gravity forces acting on the power generating apparatus. The actuation mechanism can be operated in the engaged position in order to direct the power generating apparatus to the most effective orientation with respect to the direction of the current flow at a particular time.

The mounting surface transfers the load of the power generation apparatus onto the support surface, and hence into the support structure. The substantially circular and substantially continuous nature of the mounting and support surfaces serves to distribute the loads around the support housing, and to remove, or substantially reduce, the occurrence of point loading on the support housing.

The substantially circular and substantially continuous nature of the mounting surface of the power generation apparatus and of the support surface of the support housing, in combination with the rotatable connection carrier of the power generation apparatus, also enables the mounting portion 1 to be located on the support housing 5 in any polar orientation with respect to the mounting axis M.

The ability to mount the power generation apparatus on the support structure in any polar orientation (that is, without discrete mounting locations) simplifies the deployment of the power generation apparatus to the support structure. This is because there is no requirement to orient the apparatus as it descends into its mounting position on the support structure.

The mounting and support surfaces allow the power generation apparatus to rotate with respect to the support structure, so that the apparatus can be oriented appropriately for power generation, irrespective of the orientation of the apparatus when it was first deployed to the support structure.

Due to the high loading associated with the rotor and tidal flow, it is preferable to use a clamping arrangement, such as that shown in UK Patent Number 2448710. Such a clamp arrangement allows the power generating apparatus to be oriented for power generation for an initial tide direction, and then re-oriented when the tide turns.

In addition, this polar mounting freedom of the power generation apparatus enables the location and orientation of the support structure to be simplified, since the polar orientation of the support housing is not important when the power generating apparatus can be mounted, and then operated, in any polar orientation with respect to the support structure.

The mounting arrangements described above are particularly advantageous for use with a single cable winch deployment system, such as that described in UK Patent Number 2431628. In such a configuration, a winch cable tube or aperture is provided substantially aligned with the mounting axis. In one example, a tube is provided through the connection carriers, through an arm of the actuation mechanism, and then through the main body of the power generation apparatus.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. An underwater structure comprising:
    a power generation apparatus including a main body, a mounting portion rigidly connected to the main body and defining a mounting axis, a connection carrier, a connector mounted on the connection carrier, and an actuation mechanism in communication with the connection carrier; and
    a support structure adapted for engagement with a bed of a body of water, the support structure including a support housing, a support connection carrier received within the support housing, and a support connector mounted on the support connection carrier,
    wherein the mounting portion and the support housing are adapted to cooperate with one another for mounting of the power generation apparatus on the support structure; and in which the connection carrier is releasably engageable with the support connection carrier, such that the connection carrier is moveable between:
        an engaged position in which the actuation mechanism is operable to rotate the mounting portion about the mounting axis, and
        a disengaged position in which the actuation mechanism is operable to rotate the connection carrier about the mounting axis,
    wherein the connection carrier is moveable relative to the power generating apparatus in a direction extending substantially parallel to the mounting axis.

2. An underwater structure comprising:
    a power generation apparatus including a main body, a mounting portion rigidly connected to the main body and defining a mounting axis, a connection carrier, a connector mounted on the connection carrier, and an actuation mechanism in communication with the connection carrier; and a support structure adapted for engagement with a bed of a body of water, the support structure including a support housing, a support connection carrier received within the support housing, and a support connector mounted on the support connection carrier, wherein the mounting portion and the support housing are adapted to cooperate with one another for mounting of the power generation apparatus on the support structure; and in which the connection carrier is releasably engageable with the support connection carrier, such that the connection carrier is moveable between:

an engaged position in which the actuation mechanism is operable to rotate the mounting portion about the mounting axis, a disengaged position in which the actuation mechanism is operable to rotate the connection carrier about the mounting axis, wherein the mounting portion defines a continuous planar mounting surface completely around the mounting portion, and the support housing defines a continuous planar support surface completely around the support housing, the planar mounting surface and the planar support surface arranged to abut one another when the power generation apparatus is mounted on the support structure, and wherein the connection carrier is moveable relative to the power generating apparatus in a direction, extending substantially parallel to the mounting axis.

3. A structure as claimed in claim 2, in which, in said engaged position, the connection carrier engages at least one alignment feature provided by the support connection carrier.

4. A structure as claimed in claim 2, in which, in said engaged position, the connection carrier comprises at least one alignment pin arranged in use to engage at least one aperture provided by the support connection.

5. A structure as claimed in claim 2, wherein a yaw bearing is provided by the connection carrier.

6. A structure as claimed claim 2, wherein the connection carrier is rotatable relative to the power generating apparatus about the mounting axis.

7. A structure as claimed in claim 2, wherein the support connection carrier is movable in a direction extending substantially parallel to the mounting axis, and/or rotatable relative to the mounting axis.

8. A structure as claimed in claim 7, wherein the support structure includes a single support connection actuation mechanism operable to move the support connection carrier in a direction extending substantially parallel to the mounting axis and/or to rotate the support connection carrier about the mounting axis.

9. A structure as claimed in claim 7, wherein the support structure includes a first actuation mechanism for the movement of the support connection carrier in a direction extending substantially parallel to the mounting axis, and a second actuation mechanism for rotation of the support connection carrier about the mounting axis.

10. A structure as claimed in claim 2, in which the support connection carrier is sufficiently retained within the support housing so that in the engaged position torque is transmitted into the support structure via the support housing, and in which the torque is reacted by the mounting portion.

11. A structure as claimed in claim 2, in which the support connection carrier is sufficiently retained within the support housing so that in the engaged position torque is transmitted into the support structure via the support housing, and in which the torque is reacted by the mounting portion, and in which the support connection carrier is frictionally retained within the support housing.

12. A structure as claimed in claimed in claim 2, which the support connection carrier is sufficiently retained within the support housing so that in the engaged position torque is transmitted into the support structure via the support housing, and in which the torque is reacted by the mounting portion.

13. A structure as claimed in claim 12, wherein the support connection carrier is releasably engaged with the support housing.

14. A structure as claimed in claim 2, wherein the support connection carrier is removable from the support housing.

15. A structure as claimed in claimed in claim 2, wherein the support connection carrier is provided by a substantially planar plate.

\* \* \* \* \*